J. AMOLE.
MILK-PAIL.
No. 170,504. Patented Nov. 30, 1875.
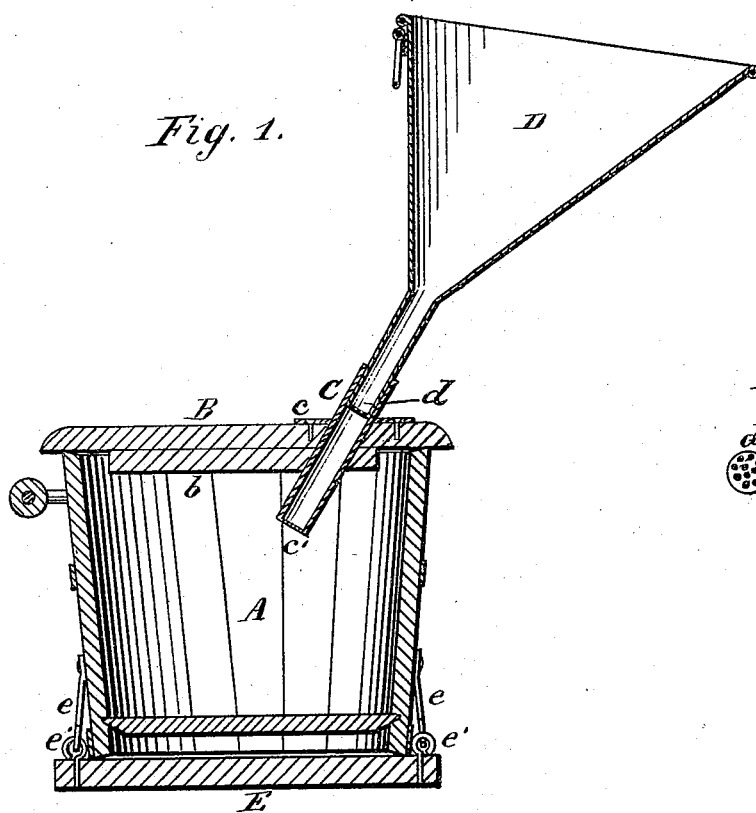
Fig. 1.
Fig. 3.
Fig. 2.
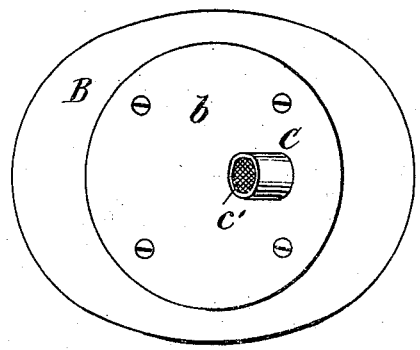
Witnesses
Charles Thurman
George L. Dyer
Inventor
John Amole
by Geo. W. Dyer & Co

UNITED STATES PATENT OFFICE.

JOHN AMOLE, OF BUCKLEY, ILLINOIS.

IMPROVEMENT IN MILK-PAILS.

Specification forming part of Letters Patent No. 170,504, dated November 30, 1875; application filed April 17, 1875.

*To all whom it may concern:*

Be it known that I, JOHN AMOLE, of Buckley, in the county of Iroquois and State of Illinois, have invented a new and useful Improvement in Milking-Pails; and I do hereby declare that the following is a full and exact description of the same, reference being had to the accompanying drawings and to the letters of reference marked thereon.

The object I have in view is the production of a milk-pail having a strainer, and adapted to be used as a milking-stool, which will be strong, durable, and convenient in use, and in which the parts may be easily separated for cleaning; and my invention therein consists in a cover of a peculiar shape adapted for a seat, and for use upon buckets of various sizes.

To enable others skilled in the art to make my device, I now proceed to describe the same in connection with the drawings, in which—

Figure 1 is a sectional view of my stool. Fig. 2 is a bottom view of the cover, and Fig. 3 are views showing the strainers.

A represents any ordinary wooden bucket, upon which rests a cover, B. This cover is oval-shaped, and is cut away on its under side, so as to leave a portion, $b$, of circular form. The part $b$ is intended to be made as small as common wooden buckets are generally manufactured, the oval-shaped top being large enough to cover a bucket of the greatest dimensions. The part $b$ above described serves not only as a stop to prevent the cover from sliding off the bucket in the movements of the person milking, but, by its weight and position, serves to prevent the tendency of the funnel to turn or tip over the cover when no one is sitting on it. It also serves to give a better support to the funnel-pipe. C is a short pipe that extends through the cover at one end on an incline, and is secured thereto by the flange $c$, which rests upon the top of said cover, and is held down by nails or screws. The pipe C is provided with a fine strainer, $c'$. D is a funnel, which fits closely in the pipe C, and has a large mouth, flattened on the side next to the operator and spreading out on the opposite side, so as to form a convenient receptacle to milk into. The funnel is provided with a coarse strainer, $d$.

The operator sits on the cover, which, by its peculiar shape, affords a comfortable seat. The funnel, being inclined, projects forward nearly under the cow. The milk, being milked into its mouth, runs down through the strainers $d$ $c'$, and is thoroughly strained by them. The coarse strainer $d$ holds all coarse dirt and checks the force of the stream of milk, and thus prevents it from forcing fine dirt or hair through the strainer $c'$. The cover keeping all dirt out of the pail, the milk can be poured into pans without further straining. After milking, the funnel can be removed from the short pipe and the parts thoroughly cleaned.

A farmer need only be supplied with a few of these covers, because they can be removed from one pail to another as they are filled.

E is a board cut in a circular form, of somewhat larger diameter than the bottom of the bucket, and is removably secured thereto by two hooks, $e$, and eyes $e'$. This board forms a firm base for the bucket to rest upon, and prevents it from being easily capsized. It also raises the bucket out of the mud and manure, and keeps it free from dirt. This base, as will be noticed, is so attached to the bucket with hooks and eyes that it is capable of receiving and holding buckets of various sizes, and is readily secured thereto or detached therefrom.

Having thus described my invention, what I claim as new, and desire to secure by Letters Patent, is—

In combination with a milk-pail, the elliptical cover B, having the downward circular projection $b$, adapted to be used with pails of different sizes, and to serve as a seat for the operator, substantially as described and shown.

This specification signed and witnessed this 9th day of April, 1875.

JOHN AMOLE.

Witnesses:
JOHN A. KOPLIN,
JOHN T. RIGGS.